Patented Nov. 3, 1931

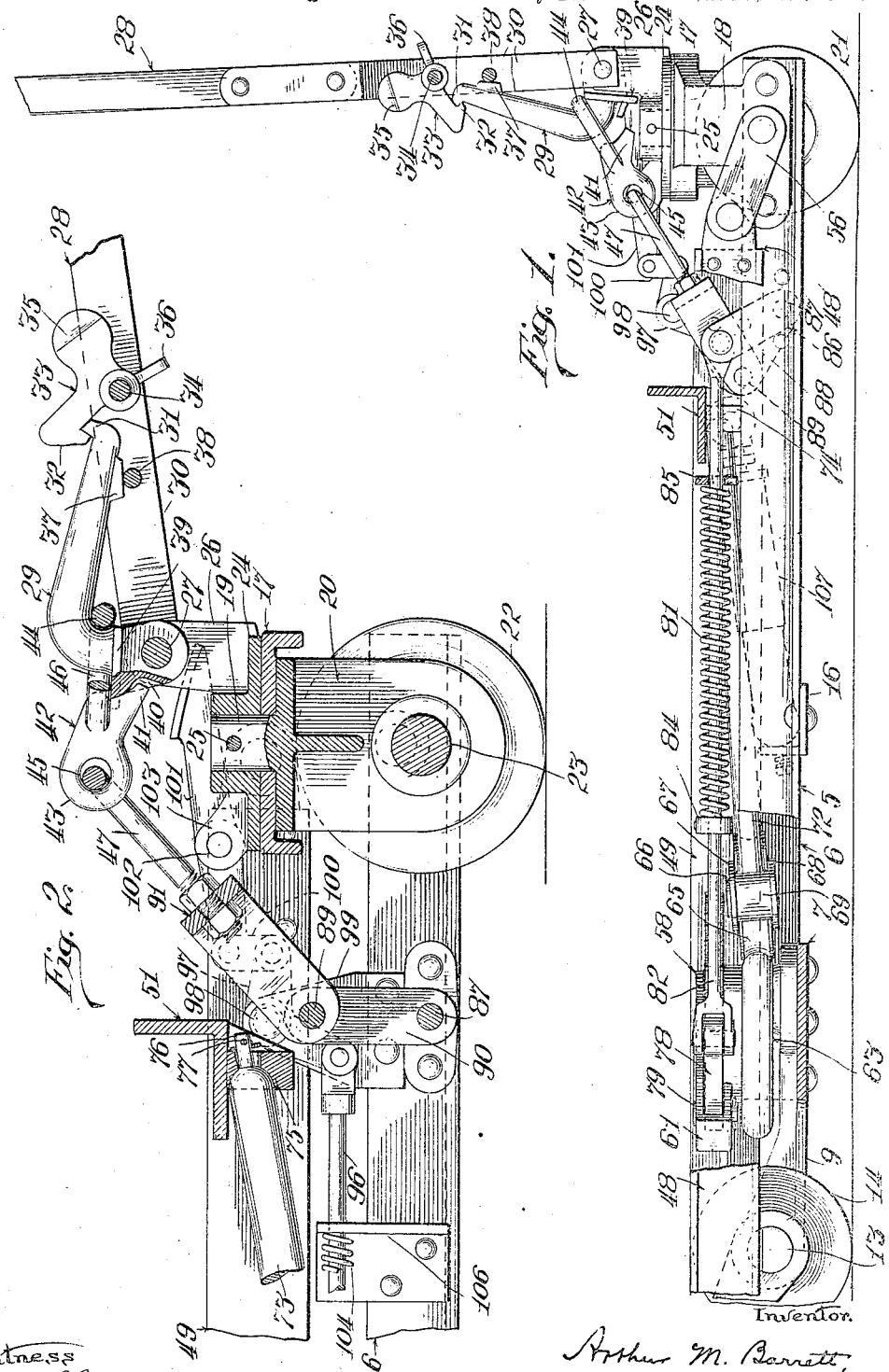

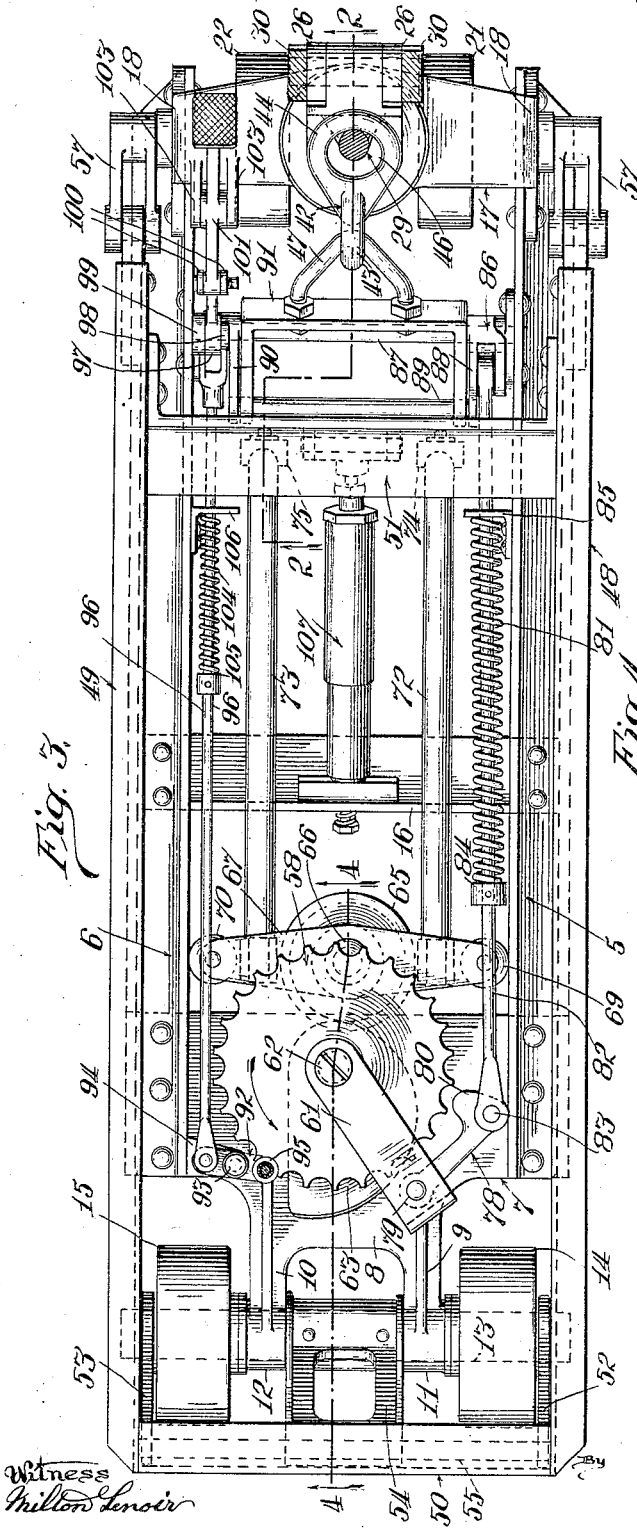

1,829,726

UNITED STATES PATENT OFFICE

ARTHUR M. BARRETT, OF WINNETKA, ILLINOIS, ASSIGNOR TO BARRETT-CRAVENS COMPANY, OF CHICAGO, ILLINOIS, A CORPORATION OF ILLINOIS

LIFTING TRUCK

Application filed June 25, 1923, Serial No. 647,662. Renewed April 13, 1931.

My invention relates to lifting trucks of the type comprising a wheel-supported frame arranged to be steered by means of a lever or handle, which also is employed to raise a lifting frame or platform supported by the wheeled or main frame. In trucks of this description it is common to connect the lifting frame with the main frame by links attached to the end portions of said frames, and so arranged that forward pull on the lifting frame causes it to rise and at the same time move forward. Two wheels are usually provided at the rear of the truck for supporting the main frame, and either one or two steering wheels support the forward portion of the main frame and have swiveled connection therewith so that by turning said wheel or wheels through the instrumentality of the handle the truck may be steered. The steering wheel or wheels are generally connected with the main frame by means of a crosshead which extends transversely of the main frame at or near its forward end and is fixedly connected with the side members of the main frame. In using these trucks they are backed under an inverted U-shaped support or platform on which the load to be transported is piled, the lifting platform being then in its lowermost position. Said lifting frame is then elevated by swinging the lever or handle forward, thereby raising the load-supporting platform with its load sufficiently high to safely clear the floor. The lifting frame is at once automatically locked in its elevated position and the truck with its load may be freely moved to the place where it is desired to deposit the load. The latch which holds the lifting frame in its elevated position is then released to permit said frame to descend and deposit the load-supporting platform on the floor, whereupon the truck may be withdrawn. Usually a check is provided to cushion and control the descent of the lifting platform.

The object of my present invention is to provide improved lifting mechanism for trucks of the kind above referred to, by which heavy loads may be raised with the expenditure of comparatively little effort on the part of the operator; by which the position of the lifting frame may be at all times under his full control; by which the leverage of the handle effective for lifting the load will be greatest during the early stages of the lifting operation; by which the lifting mechanism may be actuated conveniently from any steering position of the handle; and generally to improve the construction and operation of trucks of this type. I accomplish this object as illustrated in the drawings and as hereinafter described. What I regard as new is set forth in the claims.

In the drawings,—

Fig. 1 is principally a side elevation of my improved truck, part of the near sides of the main and lifting frames, and of the handle being broken away the better to show the construction;

Fig. 2 is an enlarged detail, being a partial longitudinal vertical section on line 2—2 of Fig. 3;

Fig. 3 is a plan view, the handle and shackle member through which it is connected with the lifting frame being in section; and Fig. 4 is a partial longitudinal vertical section on line 4—4 of Fig. 3.

Referring to the drawings,—5, 6 indicate the side members of the main or wheel frame, which are preferably angle bars and are rigidly connected together to form a rectangular frame. The rear end portions of the side bars 5, 6 are connected by a transverse plate 7, as shown in Figs. 3 and 4, from which a bracket 8 extends rearwardly, said bracket being provided with arms 9, 10 having bosses 11, 12 at their rear ends provided with journal bearings in which is journaled the rear axle 13 of the truck, as shown in the latter figures. 14, 15 indicate the rear wheels of the truck which are mounted on the axle 13. Intermediately the side bars 5, 6 are connected by a transverse bar 16, which is preferably an angle bar, and at their forward ends the side bars 5, 6 are connected by a U-shaped crosshead 17, the downturned ends 18 of which are fixedly connected with the side bars 5, 6 as shown in Fig. 1. As best shown in Fig. 2, the crosshead 17 is bored centrally to provide a bearing for the pivot pin 19 of a yoke 20 in which are mounted steering wheels 21, 22. In the construction shown the yoke 20 is double, to accommodate two steering wheels, but it will be understood that either one or two steering wheels may be provided. The steering wheels are mounted on front axles 23 supported by the yoke 20, as illustrated in Fig. 2. The upper portion of the yoke bears against the under side of the crosshead 17 in which it is swiveled on the pivot 19 so that the steering wheels may be turned laterally in either direction for steering the truck, and above the crosshead 17 a bearing plate 24 is provided which rests on the upper surface of the crosshead 17 and is non-rotatably secured to the pivot 19, preferably by a pin 25 shown in Fig. 2. The bearing plate 24 is provided at the front with upwardly projecting parallel ears 26 through which extends a pivot pin 27 which forms a pivotal support for the steering handle 28 and also for a shackle member 29 through which the steering handle is connected with the lifting frame hereinafter described. The steering handle is in the form of a lever or bar having the usual cross-piece at its upper end, and provided at its lower end with divergent side members 30 which embrace the ears 26 and are mounted on the pivot pin 27. The shackle member 29 has the general form of a bell-crank lever, one end of which is mounted on the pivot 27, while its opposite or upper end is preferably tapered, as shown in Fig. 1, and is provided with a lug or tooth 31 adapted to be engaged by the hook portion 32 of a latch 33 mounted on the handle 28 by means of a pivot 34. The latch 33 is provided with a counter-balance 35 and with a thumb-piece 36, as shown in Fig. 1, the thumb-piece 36 being to permit manual disengagement of the latch from the shackle member, and the counter-balance being for the purpose of automatically operating said latch to cause it to engage or disengage the shackle member, as the case may be. For example, when the handle 28 is turned quickly to the upright position shown in Fig. 1, the counter-balance will move the latch into position to engage the shackle member, and when the handle is turned down the counter-balance will tend to move out of engagement with said shackle member, so that by slightly lifting the handle after the lifting frame has been locked in its raised position the latch will automatically disengage the shackle member, leaving the handle free to be swung laterally to any extent necessary in steering or manipulating the truck. Preferably the shackle member 29 is provided at its forward side with a lug 37 adapted to engage a pin 38 carried by the handle, thus providing a limit stop to prevent excessive forward movement of said shackle member, and also to prevent excessive rearward movement of the handle, thereby enabling the handle to be conveniently used in backing the truck. As best shown in Fig. 1, the shackle member 29 is provided at a point near its lower or pivoted end with a plate 39 that is approximately parallel with the handle when the shackle member is in operative position. This plate extends at both sides of the shackle member and at its under margin is provided with a V-shaped notch adapted to register with a recess 40 in the under surface of the lower end portion of said shackle member, as shown in Fig. 2. Said notch and recess are adapted to receive a dog 41 that projects downwardly from the intermediate portion of a double link 42 comprising members 43, 44 rigidly connected together and disposed at a right angle to each other, the member 43 having a horizontally disposed eye 45 and the member 44 having a vertically disposed eye 46, as shown in Figs. 1 and 2. The member 44 is linked to the shackle member 29, which passes through the eye 46 thereof, as shown in said figures, and the member 43 is linked to the lifting mechanism for the lifting frame hereinafter described by means of a V-shaped link 47, the apex of which passes through the eye 45, as shown in Fig. 2. The lifting lever or handle operates through the link 47 and in conjunction with the double link 42 and shackle member 29 to raise the lifting frame, as will presently be explained. The manner in which the lifting lever or handle is mounted and the connections thereof thus far described are not herein claimed separately, as they form the subject matter of my pending application, Serial No. 623,628, filed March 8, 1923 which is now Patent Number 1,707,971 granted April 9, 1929 for a Lifting truck.

The lifting frame comprises side members 48, 49, preferably in the form of channel bars, which are connected together at the rear by an angle bar 50, and adjacent to their forward ends by a cross-bar 51, as shown in Fig. 3, said cross-bar also being preferably an angle iron as shown in Figs. 1 and 2. The lifting frame is mounted on the main or wheel frame by parallel links arranged to swing in vertical planes, the rear end of the lifting frame being supported by end links 52, 53 and an intermediate link 54, all of which are mounted on the rear axle 13, the link 54 being placed between the bosses 11, 12, as shown in Fig. 3. The upper or rear ends of said links are rounded and adapted to bear in the angle of the rear cross-bar 50, as shown in Fig. 4, and are connected together by a rod 55. The front ends of the side members 48, 49 are connected with the side members 5, 6 of the wheel frame by links 56, 57, as shown in Figs. 1 and 3. By this arrangement when the parts are in the position shown in Fig. 1, by moving the lifting frame forward it will swing upward upon the several links to the position shown in Fig. 2.

When the lifting frame is in its lowered or loading position its side members rest at the rear on the projecting ends of the rear axle 13, as shown in Figs. 1 and 3.

The mechanism for raising the lifting frame, which as has been suggested is actuated by the lifting handle 28 in conjunction with the shackle member 29, double link 42 and V-shaped link 47, will now be described. It comprises a horizontally disposed fluted ratchet wheel 58 mounted to rotate about the upper end of a vertical shaft 59 which rises from the cross-plate 7 in which it is supported and secured by a pin 60 shown in Fig. 4. The upper end portion of the shaft 59 is turned down somewhat to provide a shoulder on which the ratchet wheel 58 rests, and said ratchet wheel is secured in position by a swinging arm 61, hereinafter described, and a screw 62 or other suitable means. At the under side of the ratchet wheel 58, and also mounted on the shaft 59, is a cam 63 which is fixedly secured to said ratchet wheel, preferably by a screw 64. The cam 63 bears against the periphery of an anti-friction roller 65 journaled on a pivot 66 mounted between the upper and lower members 67, 68 of a crosshead, the end portions of which are provided with anti-friction rollers 69, 70 that ride on the vertical flanges of the side members 5, 6, as shown in Fig. 3, when the crosshead moves longitudinally of the main frame. By this construction the roller 65 is held properly in position and operates easily and smoothly. Preferably anti-friction rollers 71 are provided between the pivot pin 66 and the roller 65, as shown in Fig. 4. The crosshead composed of the members 67, 68 is connected with the cross-bar 51 of the lifting frame by thrust bars or plungers 72, 73, the rear ends of which are connected with the end portions of said crosshead, while their forward ends are rounded and bear in thrust blocks 74, 75 carried by the cross-bar 51, as indicated by dotted lines in Fig. 3 and shown in full lines in Fig. 2. Preferably the forward ends of the thrust bars 72, 73 are provided with pins 76 which pass through holes in the thrust blocks 74, 75 and are secured by cotter pins 77, as shown in Fig. 2. When the lifting frame is in its lowermost position the cam 63 occupies the position shown in Fig. 3, and the roller 65 is then at the extreme left of its range of movement as viewed in said figure. It will be evident then that by rotating the ratchet wheel 58 and the cam 63 with it, in a counter-clockwise direction as viewed in said figure and as indicated by the arrow thereon, the cam will operate to move said roller and the thrust bars 72, 73 longitudinally of the main frame to the right, thereby rocking the links 52, 53, 56, 57 that support the lifting frame, in a clockwise direction as viewed in Fig. 1, which elevates the lifting frame toward the position shown in Fig. 2. It will be evident, also, that by reason of the shape and arrangement of the cam 63, the greatest lifting leverage will be furnished at the beginning of the lifting operation, at which time it is desirable to have it, for obvious reasons.

Rotation of the ratchet wheel 58 in the opposite directions of course lowers the lifting frame.

The ratchet wheel 58 is rotated to raise the lifting frame by means of a pawl 78 pivoted at 79 on the swinging arm 61. This swinging arm extends horizontally over the upper surface of the ratchet wheel to a point beyond its periphery where it carries the pivot 79, as shown in Fig. 3. The outer end of the pawl 78 is provided with a tooth 80 adapted to fit in the notches of the ratchet wheel 58 when the outer end of the pawl is moved toward the axis of the ratchet wheel, but which clears the teeth of the ratchet wheel when the pawl is in the position shown in Fig. 3, in which position it is normally held by a spring 81 mounted on a rod 82, the rear end of which is connected with the forward or outer end of the pawl 78 by a pivot 83. One end of the spring 81 bears against a collar 84 secured to the rod 82, while its opposite or forward end bears against a stop plate 85 secured to the side member 5 of the main frame. Consequently the spring tends to move the rod 82 rearwardly and to hold the pawl 78 out of operative engagement with the ratchet wheel. The forward end of the rod 82 extends through the stop plate 85 and is pivotally connected to a bifurcated crank arm 86 carried by a rock shaft 87 that extends transversely of the main frame and is pivotally supported by any suitable bearings on the side members 5, 6, as shown in Fig. 3. The crank arm 86 extends upwardly from the rock shaft 87 and is inclined rearwardly when the lifting frame is in its lowermost position, as shown in Figs. 1 and 3. One of the members 88 of the crank arm 86 supports one end of a transverse rod 89, the other end of which is supported by a crank arm 90 near the opposite end of the rock shaft 87, and to the end portions of the transverse rod 89 between the arms 88, 90 are connected the end portions of a bail 91 to which the link 47 is secured, as shown in Fig. 3. The arrangement is such that by pulling forward on the link 47 the pull will be transmitted by the bail 91 to the rod 89, thereby rocking the arms 88, 90 forwardly or in a clockwise direction as viewed in Fig. 1, and consequently pulling the rod 82 forward. It will be noted that the pivot 83 normally lies outside a line drawn from the pivot 79 of the pawl 78 to the forward pivot of the rod 82, and consequently when the rod 82 is drawn forward it will tend to swing the pawl 78 toward the ratchet wheel and cause it to engage the teeth thereof. Further forward movement of the rod 82 will consequently cause rotation of said ratchet wheel in the direction indicated by the arrow in Fig. 3. Upon relaxation of the pull the spring 81 will move the parts back to the position shown in Fig. 3 in readiness for a repetition of the lifting stroke. It will be evident, therefore, that the operator by repeated pulling strokes on the lifting handle may rotate the ratchet wheel 58 to raise the lifting frame to any desired height within its range of movement.

For normally holding the ratchet wheel 58 against reverse rotation, a detent 92 is provided in the form of a lever pivoted intermediately of its length on a pivot 93 supported on a standard 94 carried by the crossplate 7 of the main frame. The inner end of the detent 92 is provided with an antifriction roller 95 adapted to engage the notches of the ratchet wheel 58, this roller being preferably provided with roller bearings, as indicated in Fig. 3. The opposite or outer end of the detent is connected by a connecting rod 96 with one arm of a bell-crank lever 97 mounted on a pivot 98 carried by a standard 99 which rises from the side bar 6 of the main frame, as shown in Fig. 2. The other arm of such bell-crank lever is connected by a link 100 with a foot lever 101 fulcrumed on a pivot 102 supported by lugs 103 carried by the crosshead 17, as shown in Fig. 3. A spring 104 is mounted on the rod 96 and bears at its rear end on a collar 105 secured to said rod, and at its front end against a stop plate 106 secured to the side bar 6 of the main frame. By this construction when the front end of the foot lever 101 is depressed, the rod 96 is drawn forward against the tension of the spring 104, thereby moving the roller 95 out of engagement with the ratchet wheel 58. The spring 104 tends to move the rod 96 in the opposite direction and normally holds the detent in operative engagement with the ratchet wheel, thereby preventing descent of the lifting frame between strokes of the lifting mechanism, or when it has been elevated.

Preferably a fluid check 107 of any suitable description is provided to cushion the descent of the lifting frame, said check being interposed between the cross-bar 16 of the main frame and the cross-bar 51 of the lifting frame. I prefer to use the construction and arrangement for this purpose shown and described in my pending application above referred to, but the use of a check is not essential to my present invention. Furthermore, I prefer to connect the lifting lever with the lifting mechanism by means of the shackle member 29, double link 42 and link 47, because by that arrangement the lifting lever may readily be disconnected from the lifting mechanism, and, moreover, the lifting operation is performed to better advantage. In order that this may be better understood, it may be explained that at the beginning of the lifting operation the connection between the handle 28 and the lifting mechanism is at a point close to the pivot or fulcrum of the handle; consequently the leverage of the handle is greatest at that time. The plate 39 then stands at a considerable angle to the member 44 of the double link 42, but when the handle is moved forward and downward the plate 39 is swung around until it bears against the under surface of the member 44, so that then the link 42 forms an extension of the handle, reducing its leverage but increasing the speed of the lifting operation. Incidentally the handle is converted from a lever of the second class to a lever of the first class with a load arm of different length. When this occurs the dog 41 moves into the recess 40, thereby limiting the extent to which the link 42 may be swung laterally relatively to the handle, while at the same time holding them in operative relation to each other. It will be seen that, owing to the link connection between the handle and the mechanism for raising the lifting frame, the handle may be swung laterally to a considerable extent at any time during the lifting operation without interfering with its effectiveness, and this will not interfere with the engagement of the dog 41 with the recess 40 and the corresponding notch in the plate 39, because the sides of said notch flare sufficiently to enable said dog to enter it, and the end of the dog is beveled to facilitate this operation. The capability of the link 42 of swinging laterally to a limited extent independently of the handle avoids the tendency of the load to move the handle farther from a straight fore and aft position if it should be out of such position during the lifting operation, and consequently it makes easier the operation of lifting with the handle at an angle to the longitudinal axis of the truck. It should be understood, however, that my present invention contemplates the use of any other suitable connection between the lifting lever or handle and the mechanism by which the lifting frame is raised. Also in other respects my invention is not limited to the specific construction illustrated and described, except in so far as claims may be drawn to specific features of construction, but includes generically the subject matter of the broader claims.

What I claim as my invention and desire to secure by Letters Patent, is—

1. A lifting truck comprising main and lifting frames, supporting and steering wheels, a lever operable to lift the lifting frame and to steer the truck, a rotatable member journalled between said frames to rotate about a vertical axis, means for imparting step by step motion to said rotatable member by repeated strokes of said lever, and means for translating the rotational motion of said rotatable member into lifting motion of said lifting frame.

2. A lifting truck comprising main and lifting frames, a lifting lever, a member movable endwise to raise the lifting frame, and rotatable means actuated by said lifting lever to rotate about a vertical axis for moving said member endwise.

3. A lifting truck comprising main and lifting frames, a draft and steering lever, a thrust member movable endwise to raise the lifting frame, and rotatable means disposed under said lifting frame to rotate about a vertical axis and adapted to be actuated by said lever when the same is turned to various steering positions for moving said thrust member endwise.

4. A lifting truck comprising main and lifting frames, a vertically swinging lifting lever, a member movable endwise to raise the lifting frame, and horizontally disposed rotatable ratchet mechanism actuated by said lifting lever for moving said member endwise.

5. A lifting truck comprising main and lifting frames, a lifting lever, a thrust member movable endwise to raise the lifting frame, and a horizontally disposed ratchet wheel actuated by said lifting lever for moving said thrust member endwise.

6. A lifting truck comprising main and lifting frames, a draft and steering lever, a thrust member movable longitudinally of said main frame to raise the lifting frame, a rotatable cam for actuating said thrust member, and intermittently operated reciprocating means adapted to be actuated by said lever when the same is turned to various steering positions for rotating said cam.

7. A lifting truck comprising main and lifting frames, a lifting lever, a thrust member movable endwise to raise the lifting frame, and a cam adapted to turn about a substantially vertical axis and actuated by said lifting lever for moving said thrust member endwise.

8. A lifting truck comprising main and lifting frames, a draft and steering lever, a thrust member movable longitudinally of the main frame to raise the lifting frame, a cam for so moving said thrust member, and ratchet mechanism disposed below said lifting frame and actuated by said lever for actuating said cam.

9. A lifting truck comprising main and lifting frames, a lifting lever, a ratchet wheel mounted to rotate about a substantially vertical axis, reciprocating means mounted on the main frame for rotating said ratchet wheel by said lever, and means actuated by the rotation of said ratchet wheel for raising the lifting frame.

10. A lifting truck comprising main and lifting frames, a lifting lever, a ratchet wheel, means actuated by the rotation of said ratchet wheel for raising the lifting frame, a pawl adapted to cooperate with said ratchet wheel and normally out of operative relation thereto, and means operated by movement of said lever for moving said pawl into operative engagement with said ratchet wheel.

11. A lifting truck comprising main and lifting frames, a lifting lever, a ratchet wheel, means operated by the rotation of said ratchet wheel in one direction for raising the lifting frame, a pawl adapted to operatively engage said ratchet wheel, means operated by movement of said lifting lever in one direction for moving said pawl into operative engagement with and rotating said ratchet wheel, and a spring for normally holding said pawl out of engagement with said ratchet wheel.

12. A lifting truck comprising main and lifting frames, a lifting lever, a ratchet wheel disposed horizontally, means actuated by the rotation of said ratchet wheel in one direction for raising the lifting frame, reciprocating means mounted on the main frame, for rotating said ratchet wheel in one direction by the operation of said lifting lever, a detent normaly preventing reverse rotation of said ratchet wheel, and means for moving said detent out of operative position.

13. A lifting truck comprising main and lifting frames, a lifting lever, a rotatable member mounted to rotate about a vertical axis, means actuated by the rotation of said member in one direction for raising the lifting frame, and a rod movable longitudinally of the truck by the actuation of said lifting lever for rotating said rotatable member to raise the lifting frame.

14. A lifting truck comprising main and lifting frames, a lifting lever, a crosshead movable between the side members of the main frame, a thrust member between said crosshead and the lifting frame, and means actuated by the lifting lever for moving said thrust member endwise to raise the lifting frame.

15. A lifting truck comprising main and lifting frames, a lifting lever, a crosshead movable between the side members of the main frame, a thrust member between said crosshead and the lifting frame, and rotatable means actuated by the lifting lever for moving said thrust member endwise to raise the lifting frame.

16. A lifting truck comprising main and lifting frames, a lifting lever, a crosshead movable between the side members of the main frame, a thrust member between said crosshead and the lifting frame, and a cam actuated by the lifting lever for moving said thrust member endwise to raise the lifting frame.

17. A lifting truck comprising main and lifting frames, a lifting lever, a crosshead movable between the side members of the main frame, a thrust member between said crosshead and the lifting frame, a cam for moving said crosshead endwise, and a ratchet wheel actuated by the lifting lever for actuating said cam.

18. A lifting truck comprising main and lifting frames, a lifting lever, a crosshead movable between the side members of the main frame, means actuated by the movement of said crosshead in one direction for raising the lifting frame, and means actuated by said lifting lever for so moving said crosshead.

19. A lifting truck comprising main and lifting frames, a lifting lever, a crosshead movable between the side members of the main frame and having anti-friction rollers bearing thereon, means actuated by the movement of said crosshead in one direction for raising the lifting frame, and means actuated by said lifting lever for so moving said crosshead.

20. A lifting truck comprising main and lifting frames, a lifting lever, a crosshead movable between the side members of the main frame, an anti-friction roller carried by said crosshead, means connected with said crosshead for raising the lifting frame by movement of said crosshead in one direction, a cam operatively engaging said anti-friction roller, and means actuated by said lifting lever for actuating said cam to move the crosshead.

21. A lifting truck comprising main and lifting frames, a lifting lever, a crosshead movable between the side members of the main frame, an anti-friction roller carried by said crosshead, means connected with said crosshead for raising the lifting frame by movement of said crosshead in one direction, a cam operatively engaging said anti-friction roller, and ratchet mechanism actuated by said lifting lever for actuating said cam to move the crosshead.

22. A lifting truck comprising main and lifting frames, a lifting lever, a crosshead movable between the side members of the main frame, an anti-friction roller carried by said crosshead, a thrust member connected with the crosshead for raising the lifting frame by movement of said crosshead in one direction, a cam operatively engaging said anti-friction roller, and means actuated by said lifting lever for actuating said cam to move the crosshead.

23. A lifting truck comprising main and lifting frames, a lifting lever, a crosshead movable between the side members of the main frame, an anti-friction roller carried by said crosshead, a thrust member connected with the crosshead for raising the lifting frame by movement of said crosshead in one direction, a cam operatively engaging said anti-friction roller, and ratchet mechanism actuated by said lifting lever for actuating said cam to move the crosshead.

24. A lifting truck comprising main and lifting frames, a lifting lever, a rotatable member journalled between said frames, means for imparting step by step motion to said rotatable member by repeated strokes of said lifting lever, a thrust member interposed between said rotatable member and said lifting frame for transmitting motion to said lifting frame, and means carried by said thrust member and engaging the side members of the main frame for guiding said thrust member for endwise movement.

25. A lifting truck comprising main and lifting frames, links pivotally connecting said frames, whereby said lifting frame is raised by upward swinging motion on said links, a lifting lever, a rotatable member journalled between said frames to rotate about a vertical axis, means for imparting step by step motion to said rotatable member by repeated strokes of said lifting lever, and means for translating the rotational motion of said rotatable member into endwise thrusting motion applied to said lifting frame for raising the latter.

26. A lifting truck comprising main and lifting frames, links pivotally connecting said frames, whereby said lifting frame is raised by upward swinging motion on said links, a lever serving as a draft and steering connection for said truck, a rotatable member journalled below said lifting frame, linkage operatively connecting said lever to said rotatable member for imparting a step by step rotation thereto, a thrust member interposed between said rotatable member and said lifting frame, and means carried by said thrust member and engaging the side members of the main frame for guiding said thrust member for longitudinal movement.

27. A lift truck comprising, in combination, a supporting frame, a platform elevatable with respect thereto, a draft and steering lever, means for lifting the platform comprising a shaft, means on the frame for supporting the shaft intermediate the ends of the frame and platform, a ratchet member connected with the shaft and positioned between the frame and platform, means for translating the motion of the ratchet member into lifting motion of the platform, and means adapted to be reciprocated by the operation of said lever when the same is turned to various steering positions for imparting a step by step motion to said ratchet member to raise the platform.

28. A lifting truck comprising, main and lifting frames, a steering yoke pivoted to the main frame on a vertical axis, a draft and steering lever rockably mounted upon the yoke for movement on a horizontal axis, a lifting member operable by the lever in various steering positions and movable thereby through a substantially vertical path approximately on the axis on which the yoke turns, a rotatable ratchet member journaled on the main frame and disposed between the frames, a pawl cooperating with the ratchet member for rotating the latter in lifting direction, an operating connection between the pawl and the lifting member for rotating the pawl in the rocking of the lever, said connection including a link connected to the lifting member and adapted to be reciprocated by the rocking of the lever when the same is turned to various steering positions and for imparting step by step motion to said ratchet member, and means for translating the rotational motion of said ratchet member into lifting motion of said lifting frame.

ARTHUR M. BARRETT.